United States Patent
Kim

[11] Patent Number: 5,818,144
[45] Date of Patent: Oct. 6, 1998

[54] LINEAR TYPE INDUCTION MOTOR HAVING INNER AND OUTER STATORS

[75] Inventor: Ki Bong Kim, Kyungki-Do, Rep. of Korea

[73] Assignee: Samsung Electro-Mechanics Co., Ltd., Kyungki-do, Rep. of Korea

[21] Appl. No.: 500,563

[22] Filed: Jul. 11, 1995

[30] Foreign Application Priority Data

Jul. 12, 1994 [KR] Rep. of Korea .................... P94-16940

[51] Int. Cl.$^6$ .................................................. H02K 16/00
[52] U.S. Cl. ..................... 310/266; 310/114; 310/166; 310/168; 310/112; 310/254; 310/118
[58] Field of Search ................... 310/168, 266, 310/267, 114, 67 R, 164, 112, 144, 118, 121, 122

[56] References Cited

U.S. PATENT DOCUMENTS

| | | |
|---|---|---|
| 396,355 | 1/1889 | Dyer ........................................ 310/114 |
| 1,552,155 | 9/1925 | Hawley, Jr. ............................ 310/67 R |
| 3,617,783 | 11/1971 | Sutter, Jr. ................................... 310/67 |
| 4,501,980 | 2/1985 | Welburn ..................................... 310/12 |
| 4,794,286 | 12/1988 | Taezner ...................................... 310/12 |
| 5,010,267 | 4/1991 | Lipo et al. ................................. 310/162 |
| 5,015,903 | 5/1991 | Hancock et al. ......................... 310/168 |
| 5,117,141 | 5/1992 | Hawsey et al. .......................... 310/114 |
| 5,239,217 | 8/1993 | Horst .......................................... 310/51 |
| 5,280,211 | 1/1994 | Freise et al. ............................. 310/168 |
| 5,301,523 | 4/1994 | Payne et al. ............................ 68/12.16 |
| 5,473,915 | 12/1995 | Hur et al. .................................. 68/134 |

*Primary Examiner*—Thomas M. Dougherty
*Assistant Examiner*—B. Mullins
*Attorney, Agent, or Firm*—Lowe Hauptman Gopstein Gilman & Berner

[57] ABSTRACT

A linear motor having a plurality of stator pieces rather than a ring-shaped stator. Accordingly, production costs are reduced and controllability can be improved. By coupling directly two sets of rotors and stators with a pulsator and spinning tub, an extra power transfer device can is unnecessary.

35 Claims, 4 Drawing Sheets

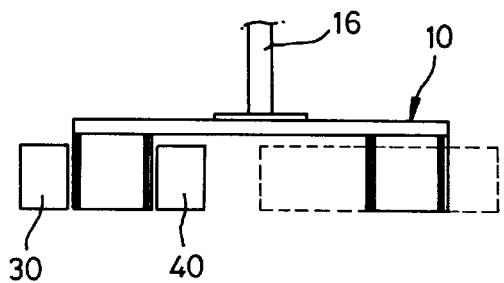
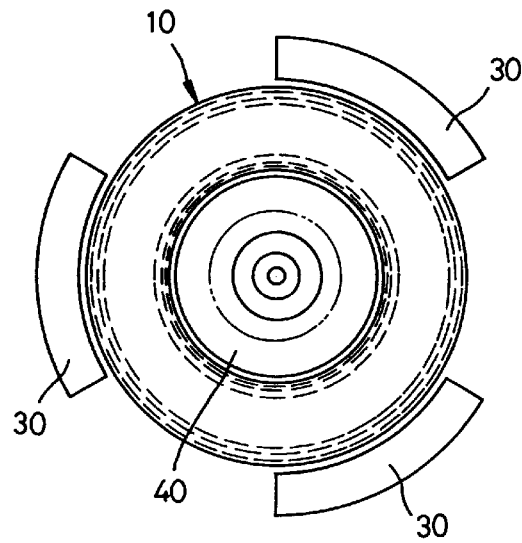
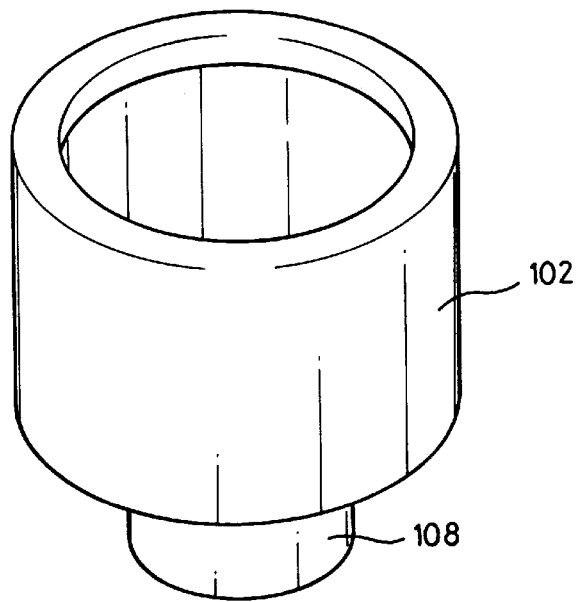

LINEAR TYPE INDUCTION MOTOR HAVING INNER AND OUTER STATORS

BACKGROUND OF THE INVENTION

1. Field of the Invention

The present invention relates to a linear-type motor applicable to a laundry machine. More particularly, this invention relates to a linear-type motor which has a plurality of stator pieces rather than a ring-shaped stator, and to a laundry machine adopting the same.

2. Description of the Prior Art

Generally, many laundry machines are driven by an induction motor through a gearbox. The motor's rotary power is transferred to a pulsator or a spinning tub through a belt or a gearbox. Reduction ratio of gears must be changed to select a washing mode or a spinning mode. However, unexpected vibration occurs because the center of gravity of a laundry machine and the shaft axis of a rotational body are not coincident with each other. Significant power loss occurs because the motor power is transferred to a rotational body through a power transfer device. What is worse, a conventional laundry machine employs an inverter to drive its motor.

In such a laundry machine like the foregoing, therefore, the structure becomes complicated and the production cost increases, due to many gears. In addition, the possibility of vibration and noise increases due to the eccentricity between the center of gravity of a laundry machine and a rotational body. The vibration causes damage to electronic circuits such as an inverter, so, expensive vibration-resistant drive circuits are required.

To avoid such problems, a laundry machine having a motor directly coupled with an axis of a pulsator or a drum without a power transfer device such as a gearbox or a belt has been developed. The center of gravity of a laundry machine becomes coincident with the axis of other rotational bodies by coupling a motor directly with a rotational body. This secures stability of mechanism and minimizes vibration and noise. The reduced vibration decreases damage to electronic circuits such as a drive circuit, control circuit, etc.

Particularly, this type of laundry machine exerts its capability, using newly developed motor. This motor has a ring-shaped stator on which an excitation coil is wound (in a conventional motor, the excitation coil is wound on a rotor not a stator), and a rotor rotates inside the stator ring.

However, complying with the recent tendency to enlarge the volume of a washing tub, a motor which yields high power is required. The motor volume must be increased for high power, but this cannot make the best use of space. Besides, a large-diameter stator ring is required to make a large motor, and this decreases the productivity of a motor and increases production costs.

SUMMARY OF THE INVENTION

The present invention has been developed to avoid the above problems. By arranging piecewise a plurality of stator pieces rather than a conventional ring-shaped stator, a large motor can be usefully adapted to a large-volume laundry machine. Compared with a conventional motor, this linear-type motor increases productivity and reduces production costs, without torque loss. A rotor rotates inside the circular space formed by stator pieces.

According to one aspect of the present invention, there is provided a linear-type motor comprising:

at least two outer stator pieces on which an excitation coil is wound;

an outer rotor, positioned inside said outer stator pieces, which rotates due to said outer stator pieces' excitation;

an inner rotor, positioned inside said outer rotor, which rotates apart from said outer rotor; and at least two inner stator pieces, positioned inside said inner rotor, on which a coil providing magnetic flux to said inner rotor is wound.

According to another aspect of the present invention, there is provided a laundry machine, having a washing tub, a pulsator for agitating the laundry inside said washing tub, and a spinning tub for spinning the laundry, said laundry machine comprising a linear-type induction motor which comprises:

at least two outer stator pieces on which an excitation coil is wound;

an outer rotor, positioned inside said outer stator pieces, which rotates due to said outer stator pieces' excitation;

an inner rotor, positioned inside said outer rotor, which rotates apart from said outer rotor;

at least two inner stator pieces, positioned inside said inner rotor, on which a coil providing magnetic flux to said inner rotor is wound; and a hub which combines said outer rotor and said inner rotor coaxially.

BRIEF DESCRIPTION OF THE DRAWINGS

This object and other advantages of the present invention will become apparent after a description of the preferred embodiments of the present invention with regard to the accompanying drawings, in which:

FIGS. 8 and 9 are cross-sectional and plane views showing a 3-pole linear motor having three outer stator pieces;

FIGS. 10 and 11 are conceptual views showing a laundry machine to which this invention a linear motor is adapted.

DETAILED DESCRIPTION OF THE PREFERRED EMBODIMENTS

Hereafter, embodiments of a linear-type motor according to the present invention will be described with reference to the attached drawings.

Figure 1:
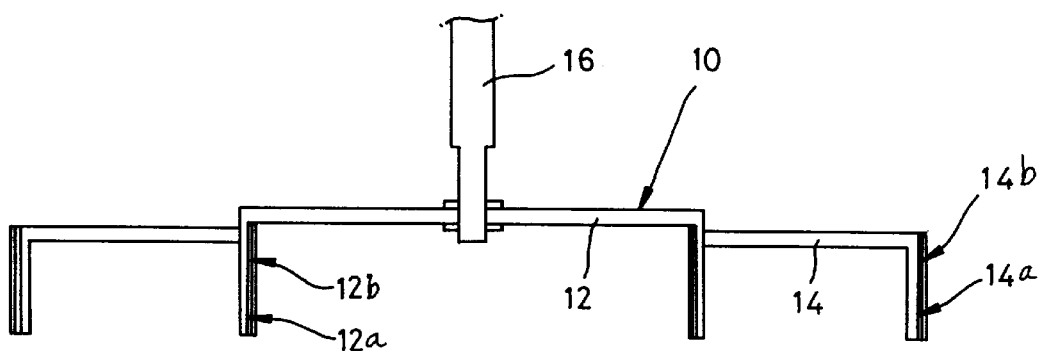
FIG. 1 is a sectional view showing a rotor of a linear motor according to the present invention.

FIG. 1 simply shows a rotor of a linear-type induction motor according to the present invention. A disk-shaped rotor 10 is composed of a double-structured rotor, i.e., an inner rotor 12 and an outer rotor 14, coupled with two stators (not shown). A shaft 16 is centered on the inner rotor 12.

When adapted to a laundry machine, this shaft 16 is coupled directly with a pulsator shaft in the laundry machine. The inner rotor 12 and the outer rotor 14 are designed to rotate at different speeds. In this embodiment, assume that the outer rotor 14 rotates faster than the inner rotor 12.

The inner and outer rotors 12 and 14 are made of reinforced plastics. On the surface of the rotors 12 and 14, back iron plates 12a and 14a and aluminum plates 12b and 14b are coated. Here, the diameter of each rotors 12 and 14 is determined by a rotational speed and a ratio τ/D which both will be described below.

Figure 2:
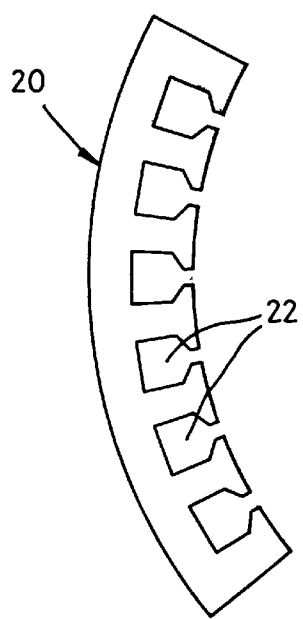
FIG. 2 is a simplified plane view showing one of outer stator pieces.

FIG. 2 shows one of the outer stator pieces installed around the outer rotor 14 depicted in FIG. 1. As shown, coil slots 22 are located inside the curvature of the stator piece 20. In every slot 22, excitation coils, which provide excitation current to poles on the rotor, are wound. A pole pitch and the number of the slots 22 are determined according to a required specification. For example, in the case of a single-phase source, two slots are 1-pole pitch. The number of the stator pieces may be increased and/or decreased according to required output power. The size of the stator pieces is determined by motor power and size.

Figure 3:
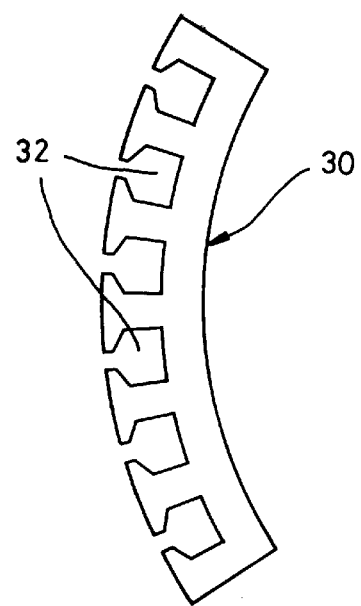
FIG. 3 is a simplified plane view showing one of inner stator pieces.

FIG. 3 shows one of the inner stator pieces installed inside the inner rotor 12 depicted in FIG. 1. As shown, coil slots 32 are located outside the curvature of the stator piece 30. A pole pitch and the number of the slots 32 are also determined according to a required specification. For example, in the case of a single-phase source, two slots are 1-pole pitch; in the case of a 3-phase source, three slots are 1-pole pitch. The number of the stator pieces may be increased and/or decreased according to required output power. The size of the stator pieces is determined by motor power and size.

The outer rotor 14 rotates due to the excitation of the outer stator pieces 20, and the inner rotor 12 rotates due to the excitation of the inner stator pieces 30.

Figure 4:
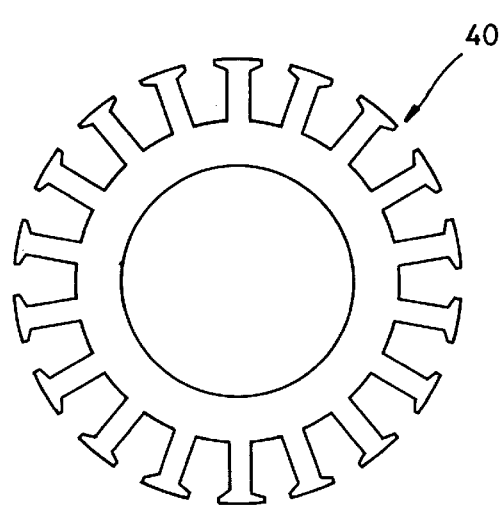
FIG. 4 shows that a ring-shaped stator takes the place of inner stator pieces depicted in FIG. 3.

FIG. 4 shows that a ring-shaped stator 40 rather than the inner stator pieces 30 depicted in FIG. 3 is installed inside the inner rotor 12. When using a motor whose inner rotor 12 has a small diameter, it is more economical and simpler to prepare a ring-shaped stator rather than several stator pieces.

Figure 5:
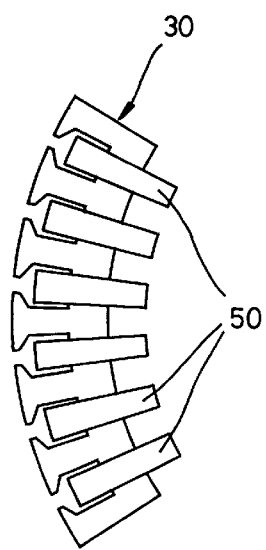
FIG. 5 shows excitation coils wound on slots of an inner or outer stator pieces.

FIG. 5 shows that excitation coils 50 are wound on the inner stator piece 30 depicted in FIG. 3. A toroidal winding is preferable to a concentric winding, for minimization of motor volume. It is also preferable that the outer stator piece 20 depicted in FIG. 2 is a toroidal winding.

Figure 6:
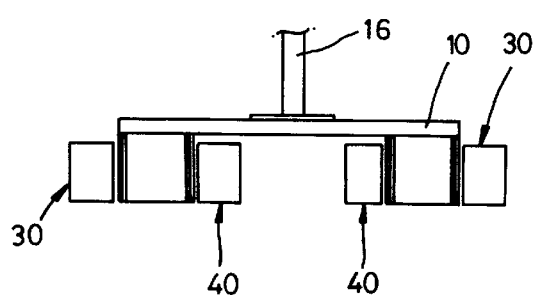
FIGS. 6 and 7 are cross-sectional and plane views showing a 2-pole linear motor having two outer stator pieces.
Figure 7:
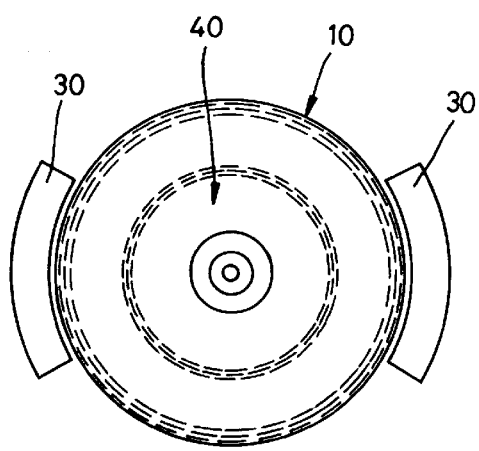

FIGS. 6 and 7 show a structure of a 2-pole linear-type motor, which has two outer stator pieces. Here, it is to be noted that the two stator pieces 30 are arranged at 180° intervals, symmetric to a rotor center. By doing so, stress in the direction of a normal is cancelled; rotational force in the direction of a tangent is redoubled.

FIGS. 8 and 9 show a structure of a 3-pole linear motor, which has three outer stator pieces. Here, it is to be noted that the three stator pieces 30 are arranged at 120° intervals, symmetric to a rotor center. By doing so, stress in the direction of a normal is cancelled, rotational force in the direction of a tangent is redoubled.

A designer can be arbitrarily add stator pieces, though not shown in the drawings, only that each of the stator pieces must be arranged symmetrically to a rotor center.

Figure 12:
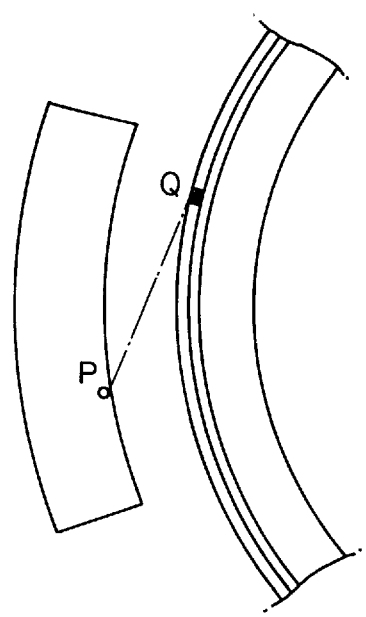
FIG. 12 is a conceptual view explaining the operation principle of the present invention linear motor.

Hereafter, the operation principle of the present invention linear-type motor will be considered. In FIG. 12, as to an arbitrary point P on the stator piece and a point Q on the rotor, a unit small-current on the point P creates a magnetic field. If this magnetic field is an alternate field, an induction current is induced on the point Q. At this moment, if the magnetic field on the point P is a time-variant moving field, the force interlinking this field has an effect on the rotor. The rotor rotates due to the interlinkage force.

What follows is a theoretical approach to the operation principle. In FIG. 12, letting magnetic flux density on the point Q due to a small-current on the point P be vector B (Wb/m²), $$B = B_{.2} \cdot a_R + B_{1\phi} \cdot a_\phi$$

in a cylindrical coordinate system, and vector magnetic potential $$A = \frac{\mu I}{4\pi} \int_C \frac{dl}{R}.$$

By the relation $B = \nabla \cdot A$, the magnetic flux density on the point Q can be determined.

The magnetic field due to a rotor current is the moving field due to a phase shift. Letting a pole pitch be τ, a synchronous velocity $$V_a = 2\tau f.$$

Letting a rotor diameter be D and the number of revolutions of a shaft be N (rpm), a mechanical circumferential velocity $$V_r = \frac{\pi D N}{60} \text{ (m/sec)}.$$

At this time, by a relative velocity $(V_s \cdot V_m)$ interlinking the moving field over the stator piece, an induction current is induced on the rotor. The current density is represented as $$\begin{aligned} J_2 &= \sigma(E + V_r \times B_1) \\ &= \sigma\left(-\frac{\partial A}{\partial t} + (V_s - V_m) \cdot a_0 \times B_{1r} \cdot a_r + B_{10} \cdot a_0\right), \end{aligned}$$

An induction current I can be found by surface-integrating the current density $J_2$.

In the above equation, the preceding term shows a component due to time change of an alternate field, and the posterior term shows a component due to interlinkage of a moving field. The former component is bi-directional force; the latter is uni-directional force. Accordingly, rearranging the moving field component, the above equation is reduced to $$J_1 = \sigma(V_r \cdot B_{\cdot 1r} \cdot a_z).$$

That is, an induction current vector is composed of an alternate field component which has the opposite direction of a stator current and a moving field component which has the same direction of a magnetic field.

The relationship between this induction current and the force due to the magnetic field on the point Q is as follows:

$$\begin{aligned} F_q &= J_2 \times B_1 \\ &= \sigma V_r \cdot B_{1r} \cdot a_z \times (B_{1\phi} \cdot a_{1\phi} + B_{1r} \cdot a_r) \\ &= \sigma(V_s - V_m) \cdot B_{1r} \cdot B_{1\phi} \cdot a_r + \sigma(V_s - V_m) \cdot B_{1r}^2 \cdot a_\phi) \\ &= F_r \cdot a_r + F_\phi \cdot a_\phi. \end{aligned}$$

Transforming the stator current into a sheet current, the whole force being acted on the point Q by the stator is $$F = F_{r1} d_{r1},$$

letting the whole length of the stator be for $-l_1$ to $l_1$. The whole force being acted on the point P by the rotor is $$F = F_{Q(r2)} \, d_{r2}$$
$$= F_{q(r1,r2)} \, d_{r1} \, d_{r2}$$
$$= F_r + F_\phi \ (N),$$

when letting the distance that the magnetic field from the stator reaches the rotor be from $-l_2$ to $l_2$. Here, $F_r$ is a radial force towards a rotor center, i.e., in the direction of a normal, and $F_\phi$ is a tangential force centering around the rotor center.

The radial force expressed as $$F_r = \sigma(V_s - V_m) \cdot B^2_{1R}$$

is a stress to the corresponding surface of a rotor. To cancel this stress, a plurality of stator pieces must be symmetrically arranged such that vector sum of $F_\phi$ becomes zero. That is, by arranging, see FIGS. 6 to 9, two or more stator pieces around the rotor, the tangential force $F_\phi$ is proportionally increased and the radial force $F_Q$ is cancelled.

Rotational power of $F_\phi$, i.e., a torque is as $$T = \frac{D}{2} \cdot F_\phi \ (N/m)$$

letting the rotor diameter be D(m), and the power of the shaft $$P_m = \omega_m T = \frac{2\pi N}{60} \cdot T.$$

Now, consider the relationship between the rotor diameter and the stator pole pitch. A laundry machine is to be operated in two speeds: (1) in a washing mode, turning speed of a pulsator or agitator, or a drum; (2) in a spinning mode, turning speed of a spinning tub. For instance, in the case of a pulsator type laundry machine, the turning speed of a pulsator is 134 rpm, and that of a spinning tub is 780 rpm.

Designing a motor complying with commercial source frequency 60 Hz, the circumferential velocity of the rotor is as $$V_{m1} = \frac{\pi D N_1}{60} \ (m/sec) \text{ in a washing mode,}$$

$$V_{m2} = \frac{\pi D N_2}{60} \ (m/sec) \text{ in a spinning mode}$$

wherein $N_1$ (rpm) denotes the turning speed of a pulsator, $N_2$ (rpm) the turning speed of a spinning tub, D(m) the rotor diameter, and $\tau$(m) the pole pitch of a stator piece. The synchronous velocity of the magnetic field over the stator is $$V_s = 2\tau f_a = 120\tau \ (m/sec).$$

Letting a slip be S, $S \approx 1\%$ when not is use, $S \approx 15\%$ in a spinning mode.

The circumferential velocity of the rotor due to the moving field $$V_m = (1 \cdot S) V_s = (1 \cdot S) \cdot 120\tau (m/sec).$$

Combining the above equations, $$120(1-S)\tau = \frac{\pi D N_1}{60} \text{ in a washing mode,}$$

$$120(1-S)\tau = \frac{\pi D N_2}{60} \text{ in a spinning mode.}$$

Accordingly, the ratio $\tau/d$ is $$\frac{\tau}{D} = \frac{\pi N_1}{7200(1-S)} \text{ in a washing mode,}$$

$$\frac{\tau}{D} = \frac{\pi N_2}{7200(1-S)} \text{ in a spinning mode.}$$

To obtain the different ratio $\tau/D$ in a washing and spinning mode, a pole pitch control and a rotor diameter changing method can be used together. To do so, as in FIG. 1, two rotors are duplicated such that each rotor can turn separately centering around a sole shaft, and two sets of stators which respectively have a different pole pitch are prepared. That is to say, in a spinning mode requiring high speed, an inner rotor rotates due to an inner stator's excitation; in a washing mode requiring low speed, an outer rotor rotates due to an outer stator's excitation. Here, the ratio $\tau/D$ of the inner stator is higher than that of the outer stator.

As described in the foregoing, because the torque is in proportion to the rotor diameter D, it is necessary to choose a maximum diameter which the ratio $\tau/D$ permits, in order to gain a torque as large as possible out of a stator which exerts regular force.

In the case a washing tub having a diameter of 48 cm or so, the diameter of a circular space formed by the respective stator pieces must be 48 cm or less, preferably, considering the diameter of a spinning tub, 35 cm or so. Assuming that the rotor diameter is 30 cm, the pole pitch of the stator piece and the rotor in FIGS. 8 and 9 is found as follow:

(1) From the equation for a washing mode $$\frac{\tau}{D} = \frac{\pi N_1}{7200(1-S)}$$

letting S=0.2 and $N_1$=134 (rpm), $\tau$=22 (cm). Therefore, in the case of a 3-pole linear motor under a single-phase source, the one stator piece length is 15.7 cm and, so, an angle becomes about 60°. FIG. 2 illustrates a sectional feature of an outer stator pieces.

(2) From the equation for a spinning mode $$\frac{\tau}{D} = \frac{\pi N_2}{7200(1-S)}$$

letting S=0.15 and $N_2$=800 (rpm), $$\begin{aligned}\tau = \ & 0.41 D \ = 6 \text{ cm, if } D = 15 \text{ cm} \\ & = 4 \text{ cm, if } D = 10 \text{ cm} \\ & = 3.3 \text{ cm, if } D = 8 \text{ cm}.\end{aligned}$$

A basic feature of an inner stator piece 30 is depicted in FIG. 3, and its functional principle is similar to the outer stator piece 20. The number of the inner stator pieces 30 can be chosen according to aiming output power.

When adopting four stator pieces, assuming that the inner rotor diameter is 15.279 cm, the stator pieces are configured like a complete-ring-shaped stator.

Figure 11:
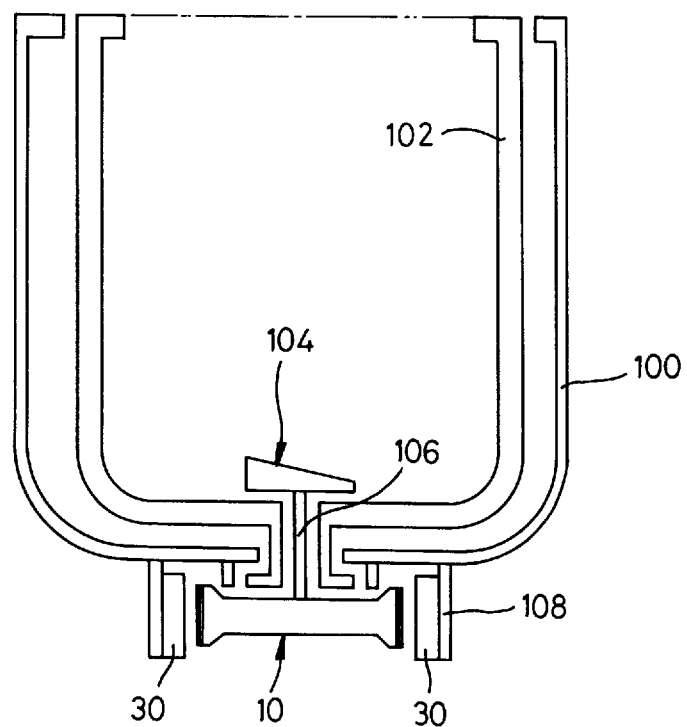

FIGS. 10 and 11 are conceptual views showing a laundry machine adopting this invention linear motor. As shown, the outer rotor 14 is coupled with an inner tub 102, and the inner rotor 12 with a pulsator 104 and shaft 106. In the drawings, the reference numeral 108 denotes a linear-type induction motor of the present invention.

To carry out both washing and spinning by one motor, a device which switches the two modes is necessary. A mechanical clutch may be used for the mode switching device. It is possible to use a clutch which has various structures and works by a solenoid coil or a synchronous motor for a drain valve.

Finally, there is electrical braking and mechanical braking to brake a motor. The electrical braking is the so-called anti-phase braking that applies the opposite voltage against the phase shift direction. The mechanical braking is a method that consumes kinetic energy by frictionizing the rotor and the tub physically.

From the foregoing, a linear-type induction motor according to the present invention exerts the performance similar to a conventional motor having a large ring-shaped stator, though it has small stator pieces. In addition, a manufacturer can reduce production costs and improve productivity. Therefore, this linear-type induction motor is applicable to machinery having large rotational bodies, e.g., a laundry machine. Motor speed can be easily changed in a washing and spinning mode without any power transfer device, and this reduces the manufacturing cost of a laundry machine. Because a motor shaft couples directly with a pulsator and a spinning tub, vibration is minimized.

What is claimed is:

1. A linear-type induction motor comprising:
   an outer stator including a plurality of outer stator pieces and an excitation coil wound on said outer stator pieces;
   a shaft;
   an outer rotor mounted on said shaft and positioned inwardly from said outer stator, and which is rotatable when electrical current is applied to said outer stator excitation coil thereby generating magnetic flux to rotate said outer rotor;
   an inner stator positioned inwardly from said outer rotor, said inner stator including a plurality of inner stator pieces positioned inwardly from said outer rotor and an excitation coil wound on said inner stator pieces; and
   an inner rotor mounted on said shaft and positioned between said outer rotor and said inner stator and which is rotatable when electrical current is applied to said inner stator excitation coil thereby generating magnetic flux to rotate said inner rotor wherein when said inner stator is energized said shaft rotates at a first rotational velocity and when said outer stator is energized said shaft rotates at a second rotational velocity, wherein only one of said outer stator and said inner stator is energized at any time.

2. The motor of claim 1, wherein the number of said outer stator pieces is two.

3. The motor of claim 1, wherein said inner stator pieces form a ring-shape.

4. The motor of claim 1, wherein the number of said outer stator pieces is four.

5. The motor of claim 1, wherein the number of said inner stator pieces is two.

6. The motor of claim 1, wherein the number of said inner stator pieces is three.

7. The motor of claim 1, wherein the number of said inner stator pieces is four.

8. The motor of claim 1, wherein said inner stator pieces are one ring-shaped stator.

9. The motor according to claim 1, wherein said respective outer stator pieces are arranged such that angles formed by the central axis of said outer stator pieces and said outer rotor center are equal to one another.

10. The motor of claim 2, wherein said outer stator pieces are spaced apart equidistantly and said angles formed by the central axis of said respective outer stator pieces and said outer rotor center are 180°.

11. The motor of claim 3, wherein said outer stator pieces are spaced apart equidistantly and said angles formed by the central axis of said respective outer stator pieces and said outer rotor center are 120°.

12. The motor of claim 4, wherein said outer stator pieces are spaced apart equidistantly and said angles formed by the central axis of said respective outer stator pieces and said outer rotor center are 90°.

13. The motor according to claim 1, wherein said respective inner stator pieces are arranged such that angles formed by the central axis of said respective inner stator pieces and said inner rotor center are equal to one another.

14. The motor of claim 5, wherein said inner stator pieces are spaced apart equidistantly and said angles formed by the central axis of said respective inner stator pieces and said inner rotor center are 180°.

15. The motor of claim 6, wherein said inner stator pieces are spaced apart equidistantly and said angles formed by the central axis of said respective inner stator pieces and said inner rotor center are 120°.

16. The motor of claim 7, wherein said inner stator pieces are spaced apart equidistantly and said angles formed by the central axis of said respective inner stator pieces and said inner rotor center are 90°.

17. A laundry machine, having a washing tub, a pulsator for agitating the laundry inside said washing tub, and a spinning tub for spinning the laundry, said laundry machine comprising a linear-type induction motor which comprises:
   an outer stator including a plurality of outer stator pieces and an excitation coil wound on said stator pieces;
   an outer rotor coupleable and positioned inwardly from said outer stator and which is rotatable when electrical current is applied said outer stator excitation coil thereby generating magnetic flux;
   an inner stator including a plurality of inner stator pieces, positioned inside said outer rotor, on which a second excitation coil is wound, said inner stator pieces providing magnetic flux to rotate said inner rotor; and
   an inner rotor coupled to said pulsator and positioned between said outer rotor and said inner stator and which is rotatable when electrical current is applied to said inner stator excitation coil thereby generating magnetic flux to rotate said inner rotor wherein when said inner stator is energized said shaft rotates at a first rotational velocity and when said outer stator is energized said shaft rotates at a second rotational velocity, wherein only one of said outer stator and said inner stator is energized at any time.

18. The laundry machine of claim 17, wherein said hub comprises clutch means for coupling said pulsator with said outer rotor in a washing mode, and for coupling said spinning tub with said inner rotor in a spinning mode.

19. The laundry machine of claim 17, wherein the number of said outer stator pieces is two.

20. The laundry machine of claim 17, wherein the number of said outer stator pieces is three.

21. The laundry machine of claim 17, wherein the number of said outer stator pieces is four.

22. The laundry machine of claim 17, wherein the number of said inner stator pieces is two.

23. The laundry machine of claim 17, wherein the number of said inner stator pieces is three.

24. The laundry machine of claim 17, wherein the number of said inner stator pieces is four.

25. The laundry machine of claim 17, wherein said inner stator pieces form a ring-shape.

26. The laundry machine according to claim 17, wherein said respective outer stator pieces are arranged such that angles formed by the central axis of said outer stator pieces and said outer rotor center are equal to one another.

27. The laundry machine of claim 19, wherein said outer stator pieces are spaced apart equidistantly and said angles formed by the central axis of said respective outer stator pieces and said outer rotor center are 180°.

28. The laundry machine of claim 20, wherein said outer stator pieces are spaced apart equidistantly and said angles formed by the central axis of said respective outer stator pieces and said outer rotor center are 120°.

29. The laundry machine of claim 21, wherein said outer stator pieces are spaced apart equidistantly and said angles formed by the central axis of said respective outer stator pieces and said outer rotor center are 90°.

30. The laundry machine according to claim 17, wherein said respective inner stator pieces are arranged such that angles formed by the central axis of said respective inner stator pieces and said inner rotor center are equal to one another.

31. The laundry machine of claim 22, wherein said inner stator pieces are spaced apart equidistantly and said angles formed by the central axis of said respective inner stator pieces and said inner rotor center are 180°.

32. The laundry machine of claim 23, wherein said inner stator pieces are spaced apart equidistantly and said angles formed by the central axis of said respective inner stator pieces and said inner rotor center are 120°.

33. The laundry machine of claim 24, wherein said inner stator pieces are spaced apart equidistantly and said angles formed by the central axis of said respective inner stator pieces and said inner rotor center are 90°.

34. The linear-type induction motor of claim 1, wherein said first rotational velocity is higher than said second rotational velocity.

35. The laundry machine of claim 17, wherein said first rotational velocity is higher than said second rotational velocity.

* * * * *